(12) United States Patent
Fabian

(10) Patent No.: US 7,748,659 B2
(45) Date of Patent: Jul. 6, 2010

(54) WIRE TENSIONING ARRANGEMENT

(75) Inventor: Gabor Fabian, Brampton (CA)

(73) Assignee: Lincoln Global, Inc., City of Industry, CA (US)

( * ) Notice: Subject to any disclaimer, the term of this patent is extended or adjusted under 35 U.S.C. 154(b) by 402 days.

(21) Appl. No.: 11/585,757

(22) Filed: Oct. 24, 2006

(65) Prior Publication Data
US 2008/0093408 A1    Apr. 24, 2008

(51) Int. Cl.
*B65H 59/22* (2006.01)

(52) U.S. Cl. .................................. 242/419.5; 242/151

(58) Field of Classification Search .............. 242/149, 242/150 R, 150 M, 151, 152, 418, 419, 419.4, 242/419.5, 419.8; 226/176, 177, 181, 182
See application file for complete search history.

(56) References Cited

U.S. PATENT DOCUMENTS

| | | | |
|---|---|---|---|
| 2,362,920 A | | 11/1944 | Moore |
| 2,686,018 A | * | 8/1954 | Courtney .................... 242/151 |
| 2,909,341 A | | 10/1959 | Kingsley |
| 3,695,548 A | * | 10/1972 | Abbott ................... 242/150 R |
| 3,874,612 A | * | 4/1975 | Hurley ...................... 242/149 |
| 5,109,690 A | | 5/1992 | Taniguchi et al. |
| 5,137,223 A | | 8/1992 | Brandon et al. |
| 5,454,502 A | * | 10/1995 | Hashikawa ................ 226/195 |
| 6,610,958 B2 | | 8/2003 | Stricklen |
| 7,026,574 B2 | | 4/2006 | Belfiore et al. |

FOREIGN PATENT DOCUMENTS

| FR | 1241232 | 9/1960 |
|---|---|---|
| WO | 97/34727 | 9/1997 |

OTHER PUBLICATIONS

International Search Report and Written Opinion from PCT/US07/080140, mailed Jan. 2, 2008.

* cited by examiner

*Primary Examiner*—John Q Nguyen
*Assistant Examiner*—William E Dondero
(74) *Attorney, Agent, or Firm*—Calfee, Halter & Griswold LLP

(57) ABSTRACT

A wire tensioning arrangement is provided for applying tension in a wire supplied to a wire feeder. The wire tensioning arrangement includes first and second tensioning members positioned on a first axis to receive the wire therebetween. The first and second tensioning members are adapted to engage opposite sides of the wire at a location on the first axis to apply a tensioning force to the wire when the wire is pulled by the wire feeder in a direction substantially perpendicular to the first axis.

14 Claims, 3 Drawing Sheets

WIRE TENSIONING ARRANGEMENT

FIELD OF THE INVENTION

The present invention relates to systems for supplying wire to a wire consuming device, such as, for example, a welder. More specifically, the present invention relates to wire tensioning arrangements for applying tension in the wire as it is fed to the wire consuming device.

BACKGROUND OF THE DISCLOSURE

Various types of wires may be supplied to many different types of machines and devices for cutting, melting, or other such consumption of the wire by the machine. For example, a consumable filler wire may be supplied to a welding machine, such as, for example, a Metal Inert Gas (MIG) welder or a Tungsten Inert Gas (TIG) welder. In such an example,s an item or items are welded by the welder, additional filler wire must be supplied to the weld site to complete the weld. A lack of tension in the wire being supplied to the wire feeder may cause the wire to twist, slacken or tangle before entering the wire feeder. Many potential causes may exist for this lack of tension in the wire being supplied to the wire feeder. In an exemplary wire supplying apparatus, a source container or payout stores a wound coil of wire to be pulled by the wire feeder and fed to the wire consuming device. As the wire feeder pulls the wire, potential energy stored within the wound wire coil is released, which may cause a portion of the wire between the wire feeder and the payout to be jerked from the coil, and as a result, twist, slacken, or tangle, which may result in delays in the wire feeding or in withdrawal of excess wire from the payout, both of which reduce efficiency of the process by which the wire is consumed.

SUMMARY

The present application contemplates a wire tensioning arrangement that is provided with a wire feeder to apply tension in a wire as it is fed by the wire feeder to a wire consuming device. According to one inventive aspect, a wire tensioning arrangement provided for applying tension in a wire being supplied to a wire feeder includes first and second tensioning members configured to receive the wire therebetween and to apply a tensioning force to the wire when the wire is pulled by the wire feeder. In one embodiment, the wire tensioning arrangement includes first and second tensioning members positioned on an axis to receive the wire therebetween. The exemplary first and second tensioning members are adapted to engage opposite sides of the wire at a location on the axis to apply a tensioning force to the wire when the wire is pulled by the wire feeder in a direction substantially perpendicular to the axis. The second tensioning member of the exemplary embodiment is configured to pivot into engagement with the first tensioning member. The load applying member is adapted to be assembled with the second tensioning member to cause the first and second tensioning members to apply a tensioning force to a wire disposed between the first and second tensioning members when the wire is pulled by a wire feeder.

According to another inventive aspect of the present application, a wire tensioning device may be configured to apply a user adjustable tensioning force to the wire, for example, to accommodate wires of varying size, shape, hardness, and friction. Other inventive aspects of the present application may also be provided, alone or in combination with each other or with the above aspects, to provide further advantages, such as, for example, to facilitate the application of tensioning force, adjustment of tensioning force, and/or control of resistance or drag on the wire during feeding. Exemplary features relating to these other aspects include, but are not limited to: providing a lever arm to which a load may be applied for pivoting a second tensioning member to engage a first tensioning member; providing a load applying member that may be assembled to different locations on a second tensioning member to apply different tensioning forces between the first and second tensioning members; and providing rollers for engaging the wire to facilitate moving the wire toward the wire feeder during feeding of the wire.

Exemplary embodiments described in the present application relate to wire tensioning arrangements that may be used in weld systems and assemblies, in which a consumable wire is fed to a wire consuming portion of a welder to provide filler material for a weld and/or an electrode for completing an arc for welding. However, it should be noted that many of the aspects described in the present application may be provided in tensioning arrangements for other uses, such as, for example, use with packaging and manufacturing equipment, and with other types of wires, cables, or cords, such as, for example, electrical wiring, packaging wire, string, or binding. In the present application, unless explicitly indicated otherwise, the term "wire" is to be interpreted broadly to also include any cable, cord, tape, string, or binding, or any other length of flexible material capable of being fed to a wire consuming device.

Further advantages and benefits will become apparent to those skilled in the art after considering the following description and appended claims in conjunction with the accompanying drawings.

DETAILED DESCRIPTION

According to one inventive aspect of the present application, a wire tensioning arrangement may be provided for use with a wire feeder. The wire tensioning arrangement may apply sufficient tension to the wire to prevent the wire from twisting or slackening as the wire is fed into the wire feeder for delivery to a wire consuming device, such as, for example, a welder or packaging machine. This tension in the wire being fed into the wire feeder reduces or prevents twisting or slackening which may otherwise result, for example, from the release of stored potential energy in a wound wire coil as the wire is withdrawn or pulled from the coil. By reducing or eliminating the effect of this twisting or slackening, tensioning the wire at a location between the wire feeder and a wire source, such as a wire coil or container, may reduce the amount of excess wire withdrawn from the source container during feeding, and/or prevent operating difficulties resulting from tangles in the wire.

Figure 1:
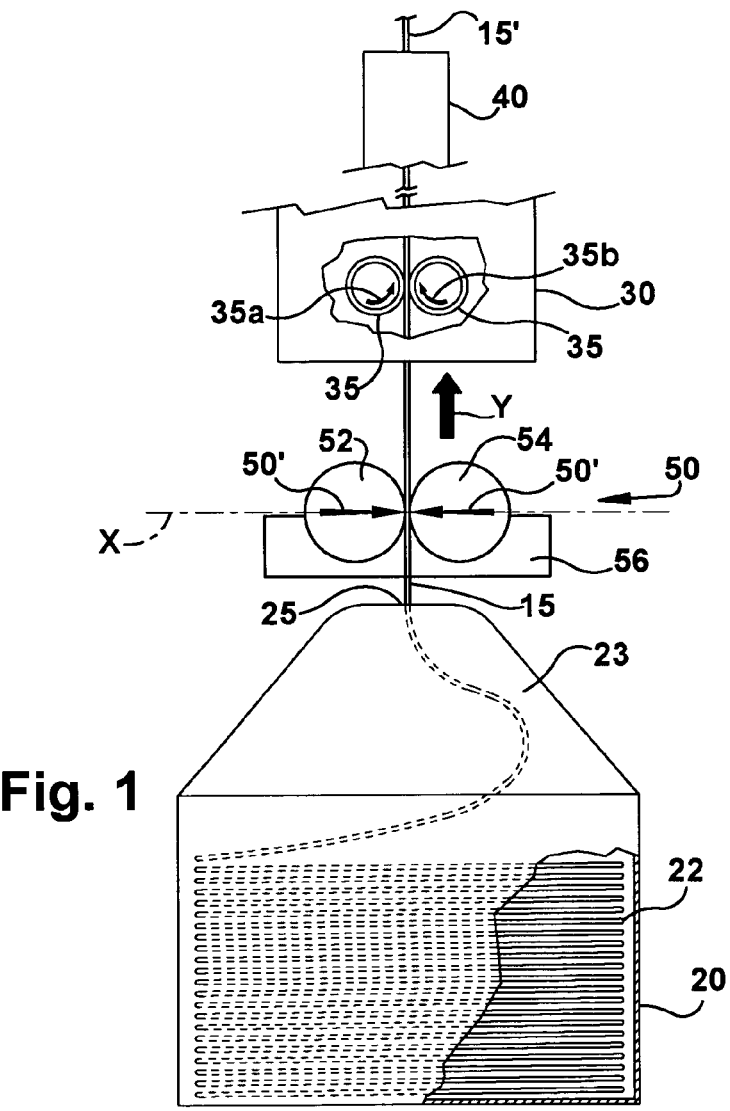
FIG. 1 is a simplified schematic illustration of a wire supplying apparatus in partial cross-section.

FIG. 1 illustrates a schematic example of a wire supplying apparatus 10 including a wire tensioning arrangement 50 according to an embodiment of the present application. The wire supplying apparatus 10 includes a wire source 20 in which a supply of wire 22 is stored. While the wire source 20 is represented schematically as a container or payout, and the wire supply 22 is represented schematically as a cylindrical coil, the wire source 20 may be any location in which a supply of wire is disposed, and the wire supply 22 may be one of many different configurations, including, for example, different shaped drums, coils, or spools, or even a loose bundle or pile of wire. One example of a wire payout for use with a wire feeder for a welding device is described in U.S. Pat. No. 7,004,318, which is hereby incorporated by reference in its entirety.

In the schematic example of FIG. 1, the wire 15 is withdrawn through an opening 25 in a cover portion 23 of the payout 20 by a wire feeder 30, which grips and pulls the wire 15 to deliver an end 15' of the wire to a wire consuming device 40, such as, for example, a welder. The wire feeder 30 may employ many different feeding mechanisms to feed the wire 15 to the wire consuming device 40. The exemplary wire feeder 30 includes a pair of motor driven pinch or feed rollers 35 configured to grip the wire 15 and rotate in opposite directions, as shown by arrows 35a, 35b, to pull the wire toward the wire consuming device 40. An example of such a wire feeding apparatus is described in U.S. Pat. No. 5,816,466, which is hereby incorporated by reference in its entirety.

According to an inventive aspect of the present application, to prevent the wire 15 from twisting or slackening before it reaches the wire feeder 30, a wire tensioning arrangement 50 is provided between the wire source 20 and the wire feeder 30 to apply a pinching or tensioning force to the wire 15. In one embodiment, the wire 15 is received between first and second tensioning members 52, 54, which are pressed or forced together to provide a tensioning force, illustrated schematically by arrows 50', to the wire 15. The first and second tensioning members may, but need not, be positioned on an axis X; that is, collinear with each other. In such an embodiment, the tensioning members 52, 54 may be positioned to provide lateral or transverse tensioning forces 50' on the wire 15, as illustrated schematically in FIG. 1. This may reduce or prevent stretching or bending of the wire 15 as it is pulled by the wire feeder in a direction Y, which may be substantially perpendicular to the axis X. The tensioning members 52, 54 may be provided at fixed positions configured to both receive the wire 15 and apply the desired tensioning forces 50'. In another embodiment, one or both of the tensioning members 52, 54 may be forced or pressed towards each other by a tensioning mechanism 56 to engage the wire 15. The tensioning mechanism 56 may be integral to or connected with either or both of the tensioning members 52, 54. In one embodiment, the tensioning mechanism 56 may be user adjustable to adjust the tensioning force 50' on the wire 15, for example, to accommodate wires of different size, shape, hardness, friction, or other such variables. For example, a lower tensioning force may be desired when feeding a softer wire, as the wire may be more easily gripped by the tensioning members, whereas a higher tensioning force may deform the wire.

Figure 2:
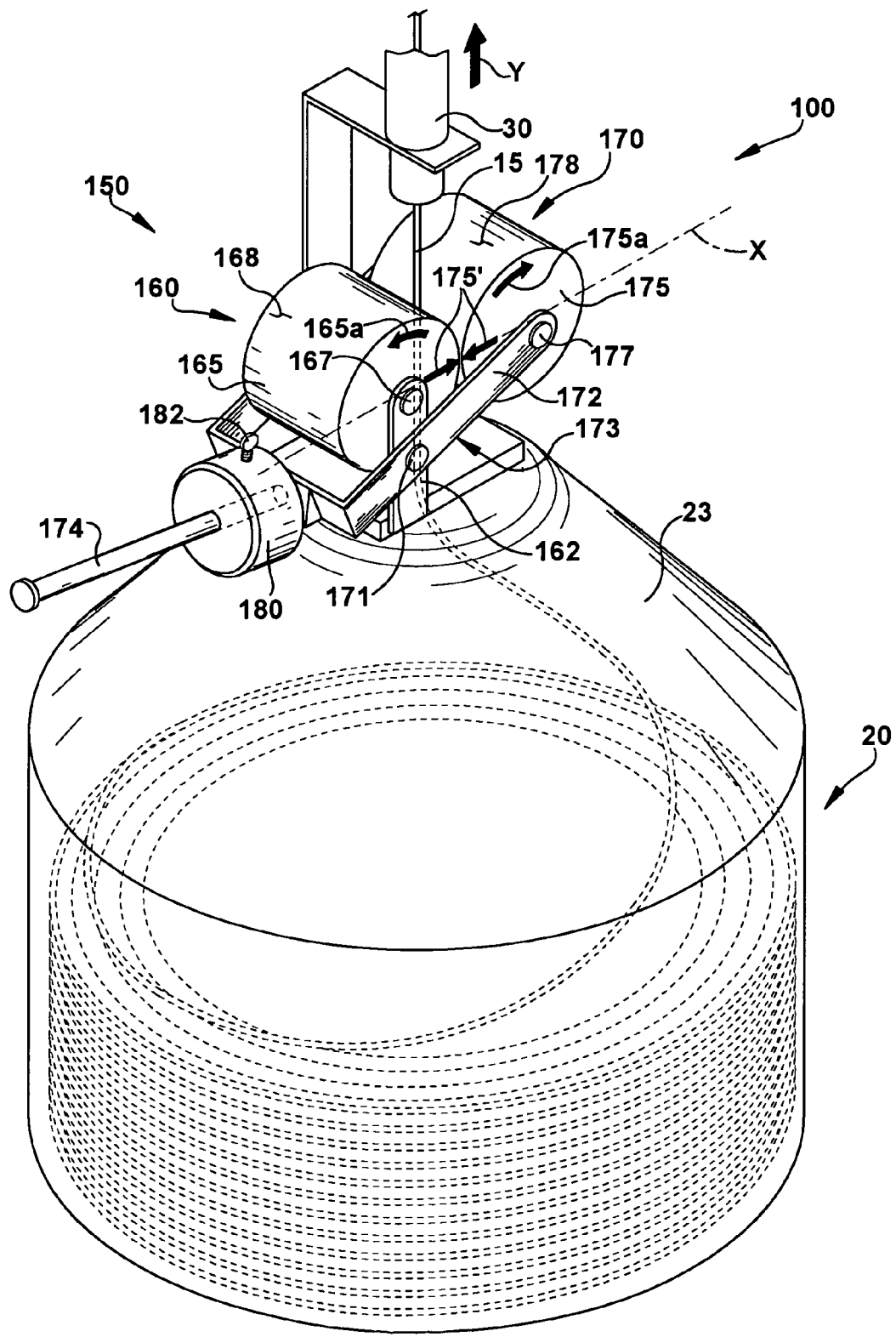
FIG. 2 is a side perspective view of a wire tensioning arrangement.

FIG. 2 illustrates an exemplary embodiment of a wire tensioning arrangement 150 provided with a wire supplying apparatus 100 for a welder (not shown). The exemplary wire tensioning arrangement 150 includes first and second tensioning members 160, 170 which receive a wire 15 for a wire feeder 30. The wire tensioning arrangement 150 applies a tensioning force to the wire 15 when the wire 15 is pulled by the wire feeder 30. The wire tensioning arrangement 150 may be assembled with the wire supplying apparatus 100 in many different configurations or orientations. In the illustrated embodiment, the first tensioning member 160 includes a support member or bracket 162 which may be affixed, for example, to the payout 20, which positions the tensioning arrangement 150 to receive the wire 15.

Many different types and combinations of components and surfaces may be provided to engage the wire for applying the tensioning force to the wire 15, such as, for example, pads, belts, bearings and rollers. In one such embodiment, one or more rolling members may be used to facilitate longitudinal movement of the wire 15 when the wire is pulled, while applying tensioning forces to the wire 15. In the illustrated embodiment, the first and second tensioning members 160, 170 include rollers 165, 175 positioned on an axis X, which rotate on roller pins 167, 177 to allow the wire 15 to be pulled toward the wire feeder 30 while applying tensioning forces, illustrated by arrows 175', to the wire 15. As the wire 15 is fed toward the welder, the rollers 165, 175 rotate, as shown by arrows 165a, 175a, to reduce pulling resistance or drag on the wire 15. The reduced resistance or drag by the rollers 165, 175 may allow the wire feeder 30 to pull the wire 15 without any substantial increase in required pulling force by the wire feeder 30. The reduced resistance or drag may also reduce wear, damage, or the generation of heat in the wire 15, which may otherwise result from friction between the wire 15 and the tensioning members 160, 170. While the illustrated rollers 165, 175 may freely rotate on the roller pins 167, 177, one or both of the rollers may also be provided with additional tension or drag in applications in which some resistance to pulling is desired. One or both of the rollers 165, 175 may also be driven, such as, for example, by a stepper motor (not shown), for applications in which assistance in pulling the wire 15 is desired.

Additionally, one or both of the rollers 165, 175 may be provided with a soft wire-engaging surface 168, 178, such as a rubber surface, to allow the rollers 165, 175 to deform around the wire 15 to grip the wire and limit lateral movement of the wire between the rollers 165, 175. In such an embodiment, portions of the wire-engaging surfaces 168, 178 may contact each other due to deformation of the surfaces 168, 178 around the wire 15. While the wire-engaging surface 168, 178 may be wear resistant to sustain a grip on the wire 15 after extensive use, the rollers 165, 175 may also be provided with replaceable wire-engaging surfaces 168, 178. Additionally or alternatively, the position of the wire 15 with respect to the rollers 165, 175 may be adjusted to tension the wire between portions of the wire-engaging surfaces 168, 178 that are less worn. Further, different portions of the rollers 165, 175 may be provided with different wire-engaging surfaces (e.g., different hardnesses, frictions, or surface patterns), to accommodate different types of wire by adjusting the position of the rollers 165, 175 with respect to the wire 15.

Many different tensioning mechanisms may be employed to press or engage first and second tensioning members against a wire disposed between the tensioning members to apply a tensioning force to the wire when the wire is pulled. Accordingly, one or both of the tensioning members may be movable with respect to each other, such as, for example, by sliding, pivoting, or compressing. The tensioning members may be adapted to longitudinally align on the wire when applying a tensioning force, such that the tensioning force is substantially collinear. In one embodiment, the second tensioning member may be configured to pivot against a stationary first tensioning member. For example, the second tensioning member may be pivotally connected to a portion of the first tensioning member, such as, for example, a support member, such that the second tensioning member may be pivoted against the first tensioning member. The second tensioning member may include a lever arm, configured such that a load applied to the lever arm causes the second tensioning member to pivot against the first tensioning member to apply a tensioning force to the wire disposed between the tensioning members.

In the illustrated embodiment of FIG. 2, the second tensioning member 170 include a bracket 172 assembled with the roller pin 177. The bracket 172 is pivotally connected to the support member 162 of the first tensioning member 160 at a pivot point 171, allowing the roller pin 177 and roller 175 to pivot into engagement with the wire 15 and roller 165. An extension, such as a rod 174, extends from the bracket 172 away from the roller 175. The bracket 172 and rod 174 together form a lever arm 173 configured to transfer a tensioning force 175' to the wire 15 through the roller 175 when the wire 15 is pulled. In one embodiment, the rod 174 may be of sufficient weight to pivot the roller 175 against the roller 165 of the first tensioning member 160 to apply a tensioning force 175' to the wire 15. In other embodiments, a tensioning force may be provided by engaging a weighted item or other load applying member with the lever arm. In one such embodiment, the tensioning force may be adjusted by adding or repositioning one or more weighted items on the lever arm. In the illustrated embodiment, a load applying member 180 may be assembled with the rod 174 to apply a desired tensioning force 175' to the wire 15.

Figure 3A:
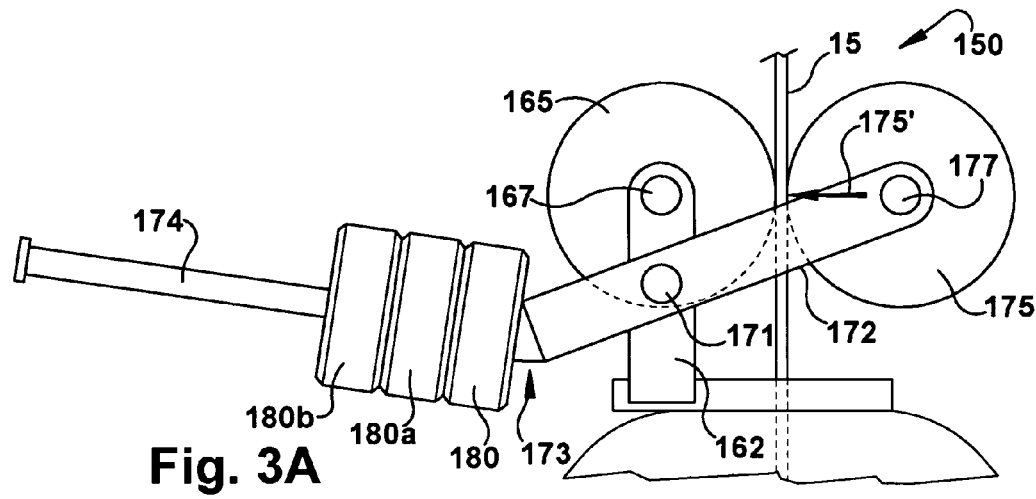
FIG. 3A is a schematic view of a wire tensioning arrangement with multiple force applying members.
Figure 3B:
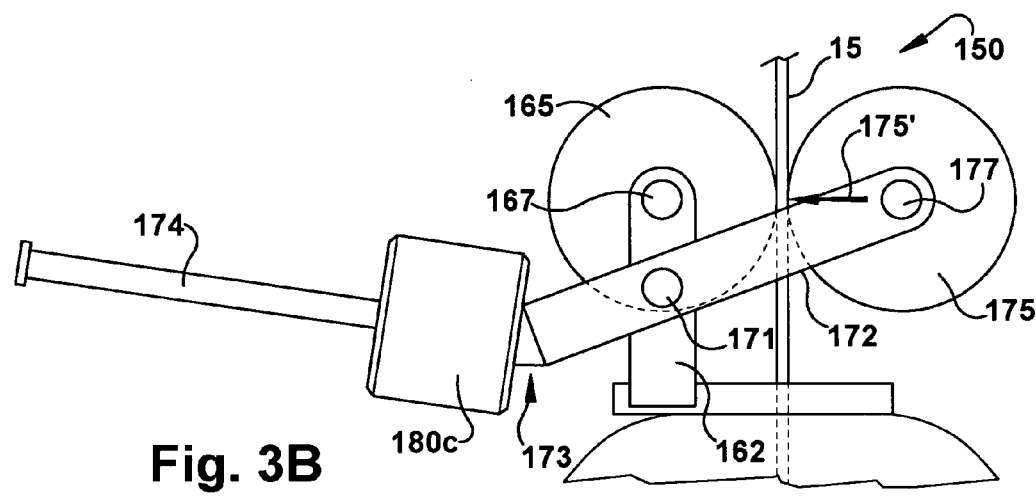
FIG. 3B is a schematic view of the wire tensioning arrangement of FIG. 3A with a different force applying member.
Figure 3C:
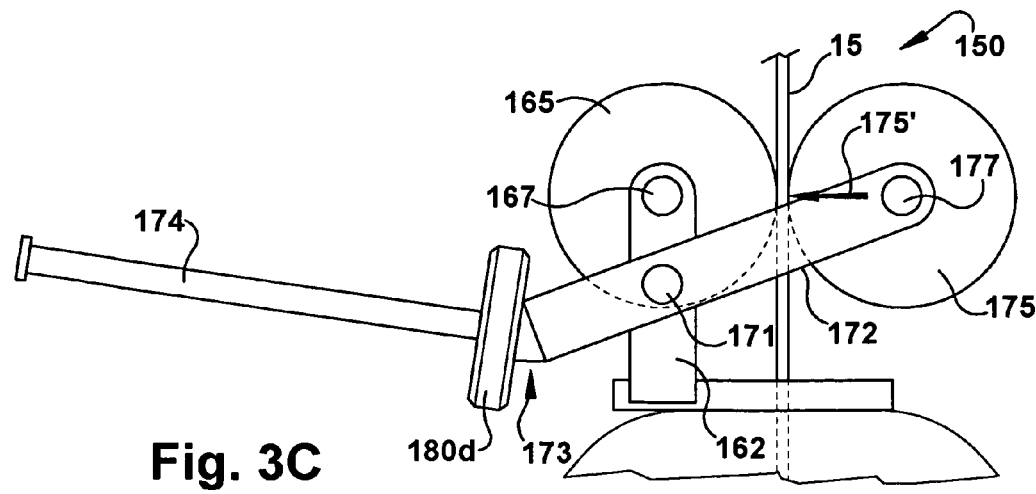
FIG. 3C is a schematic view of the wire tensioning arrangement of FIG. 3A with a different force applying member.

A load applying member may be applied to or assembled with a tensioning member lever arm using many different mechanisms or configurations, such as, for example, hooks, fasteners, clamps, or adhesives. In one embodiment, the rod 174 may be upwardly angled away from the bracket 172 and pulley 175 to allow the load applying member 180 to be retained by simply slipping an opening 184 in the load applying member 180 over the rod 174. In such an embodiment, the tensioning force 175' may be adjusted by adding additional load applying members 180a, 180b to the rod 174, as shown in FIG. 3A, or by replacing the load applying member 180 with a heavier load applying member 180c, as shown in FIG. 3B, or a lighter load applying member 180d, as shown in FIG. 3C.

Figure 4:
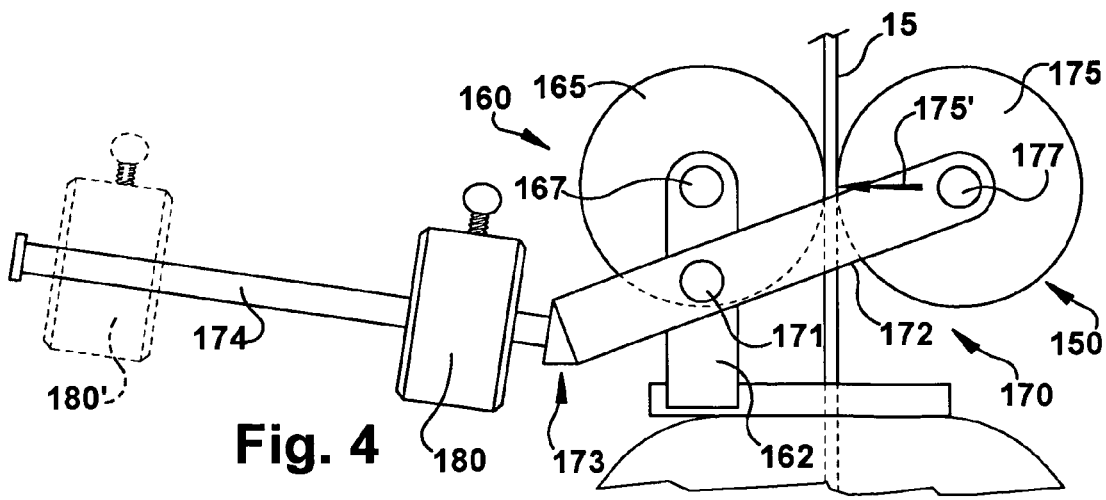
FIG. 4 is a schematic view of a wire tensioning arrangement with a positionable force applying member.

In another embodiment, the force applied by the lever arm is adjustable by adjusting the position of the load applying member on the lever arm. By positioning the load applying member 180 closer to the pivot point 171, as shown schematically in FIG. 4A, a lesser load or tensioning force 175' may be applied to the wire 15 by the roller 175. Conversely, by positioning the load applying member 180 further from the pivot point 171, as shown in phantom at 180', the tensioning force 175' may be increased. In the illustrated embodiment of FIG. 2, the load applying member 180 is assembled to the rod 174 by a set screw 182, which allows the load applying member 180 to be positioned anywhere on the rod 174 by tightening the set screw 182 on the rod 174.

By varying the weight of the load applying member 180 and/or the distance from the pivot point 171 to the load applying member 180, a wide range of tensioning forces may be applied to accommodate many different applications. In an exemplary embodiment, a load applying member weighs approximately 2.8 lbs (1.27 kg) and a rod 174 allows for assembly of the load applying member 180 at a distance from a pivot point 171 ranging from approximately 2.5 inches (6.35 cm) to approximately 10.5 inches (26.67 cm), to produce a tensioning force range of approximately 4.75 lbf (21.2 N) to approximately 20.0 lbf (88.9 N).

While various inventive aspects, concepts and features of the inventions may be described and illustrated herein as embodied in combination in the exemplary embodiments, these various aspects, concepts and features may be used in many alternative embodiments, either individually or in various combinations and sub-combinations thereof. Unless expressly excluded herein all such combinations and sub-combinations are intended to be within the scope of the present inventions. Still further, while various alternative embodiments as to the various aspects, concepts and features of the inventions—such as alternative materials, structures, configurations, methods, circuits, devices and components, software, hardware, control logic, alternatives as to form, fit and function, and so on—may be described herein, such descriptions are not intended to be a complete or exhaustive list of available alternative embodiments, whether presently known or later developed. Those skilled in the art may readily adopt one or more of the inventive aspects, concepts or features into additional embodiments and uses within the scope of the present inventions even if such embodiments are not expressly disclosed herein. Additionally, even though some features, concepts or aspects of the inventions may be described herein as being a preferred arrangement or method, such description is not intended to suggest that such feature is required or necessary unless expressly so stated. Still further, exemplary or representative values and ranges may be included to assist in understanding the present disclosure; however, such values and ranges are not to be construed in a limiting sense and are intended to be critical values or ranges only if so expressly stated. Moreover, while various aspects, features and concepts may be expressly identified herein as being inventive or forming part of an invention, such identification is not intended to be exclusive, but rather there may be inventive aspects, concepts and features that are fully described herein without being expressly identified as such or as part of a specific invention, the inventions instead being set forth in the appended claims. Descriptions of exemplary methods or processes are not limited to inclusion of all steps as being required in all cases, nor is the order that the steps are presented to be construed as required or necessary unless expressly so stated.

The invention claimed is:

1. A wire tensioning arrangement for applying tension in a wire supplied to a wire feeder, the tensioning arrangement comprising:

first and second tensioning members positioned on corresponding first and second lateral sides of a wire axis to receive the wire therebetween extending along the wire axis and adapted to engage opposite sides of the wire to apply a tensioning force to the wire when the wire is pulled by the wire feeder in a direction substantially parallel to the wire axis, the first tensioning member being mounted to a support member, the second tensioning member being mounted to a first end of a lever arm; and a load applying member connected with a second end of the lever arm laterally outward of the first tensioning member and applying a load to the lever arm at a location on the first lateral side of the wire axis in a direction substantially parallel to the wire axis to bring the first and second tensioning members into tensioning engagement with the wire;

wherein the lever arm is pivotally connected to the support member at a location between the first and second ends of the lever arm.

2. The tensioning arrangement of claim 1, wherein the load applying member is adapted to be assembled with the lever arm.

3. The tensioning arrangement of claim 1, wherein the first tensioning member comprises a roller rotatably mounted to the support member.

4. The tensioning arrangement of claim 3, wherein the second tensioning member comprises a second roller rotatably mounted to the lever arm, wherein the load applying member is adapted to be assembled with the lever arm to press the second roller against the first stated roller to apply the tensioning force to the wire therebetween.

5. The tensioning arrangement of claim 4, wherein the tensioning force is adjustable by adjusting the position of the load applying member on the lever arm.

6. The tensioning arrangement of claim 4, wherein the load applying member is adapted to be assembled with the lever arm by a set screw.

7. The tensioning arrangement of claim 4, further comprising a second load applying member adapted to be assembled with the lever arm to apply a second tensioning force to the wire between the first and second tensioning members, wherein the second tensioning force is different than the first stated tensioning force.

8. A wire supplying apparatus, comprising:
a wire feeder adapted to feed a wire to a wire consuming device;
a wire tensioning device comprising first and second tensioning members positioned on corresponding first and second lateral sides of a wire axis to receive the wire therebetween extending along the wire axis and adapted to engage opposite sides of the wire to apply a tensioning force to the wire when the wire is pulled by the wire feeder in a direction substantially parallel to the wire axis, the first tensioning member being mounted to a support member, the second tensioning member being mounted to a first end of a lever aim, the lever aim being pivotally connected to the support member; and
a load applying member connected with a second end of the lever arm laterally outward of the first tensioning member and applying a load to the lever arm in a direction substantially parallel to the wire axis, the load acting on the second tensioning member to bring the first and second tensioning members into tensioning engagement with the wire;
wherein the load applying member applies a load to the second tensioning member at a location on the first lateral side of the wire axis;
further wherein the lever arm is pivotally connected to the support member at a location between the first and second ends of the lever arm.

9. The apparatus of claim 8, further comprising a wire source for supplying the wire to the wire feeder, wherein the wire tensioning device is disposed between the wire feeder and the wire source.

10. The apparatus of claim 8, wherein the second tensioning member is configured to pivot against the first tensioning member.

11. The apparatus of claim 8, wherein the first tensioning member comprises a roller rotatably mounted to the support member.

12. The apparatus of claim 11, wherein the second tensioning member comprises a second roller rotatably mounted to the lever arm.

13. The apparatus of claim 12, wherein the tensioning force is adjustable by adjusting the position of the load applying member on the lever arm.

14. The apparatus of claim 8, wherein the wire feeder is configured to feed welding wire to a welder.

* * * * *